March 20, 1928.
G. C. MEGLING
1,663,056
SCRUBBING AND DRYING MACHINE
Filed Feb. 7, 1924    3 Sheets-Sheet 1
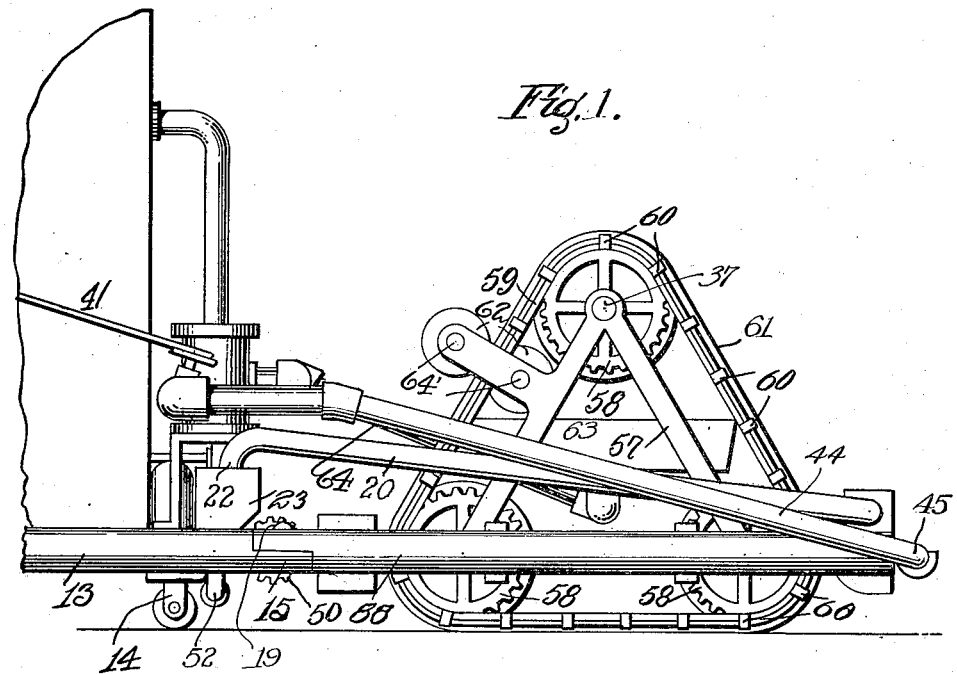
Inventor
George C. Megling.

March 20, 1928.  
G. C. MEGLING  
1,663,056  
SCRUBBING AND DRYING MACHINE  
Filed Feb. 7, 1924 3 Sheets-Sheet 2
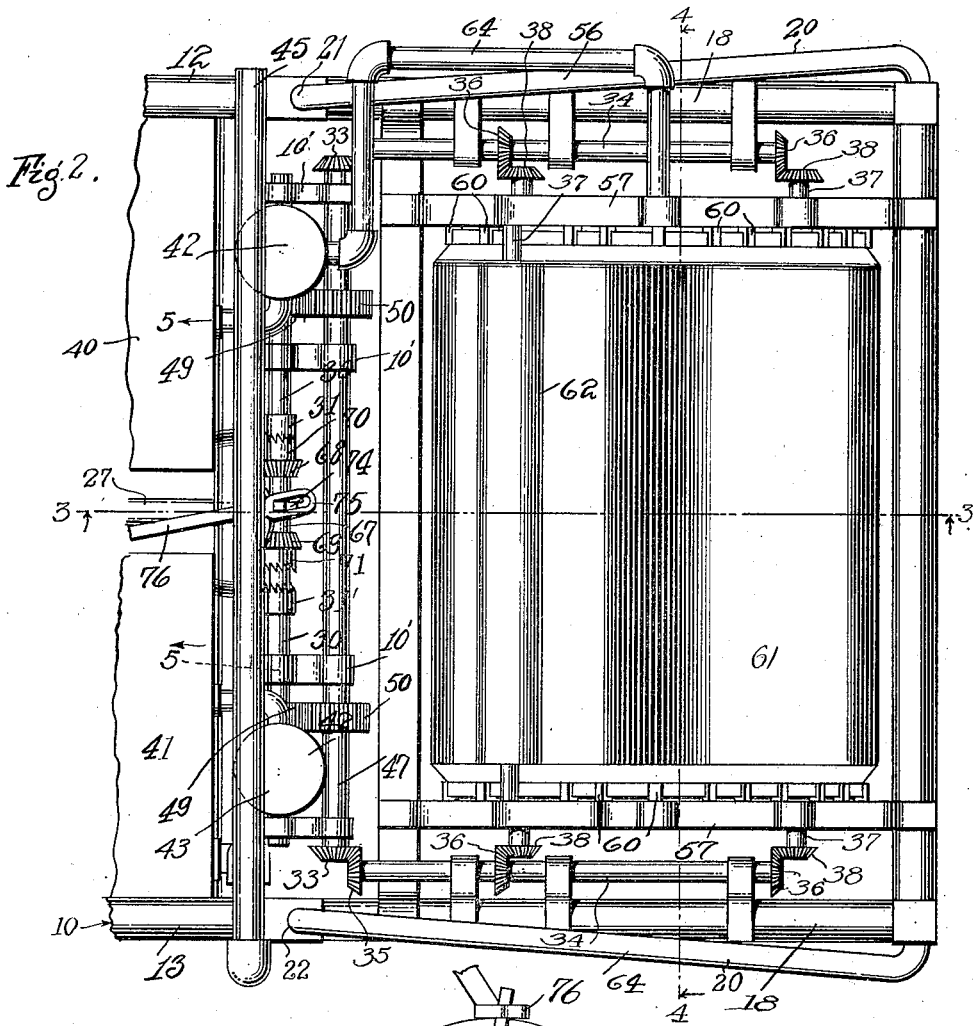
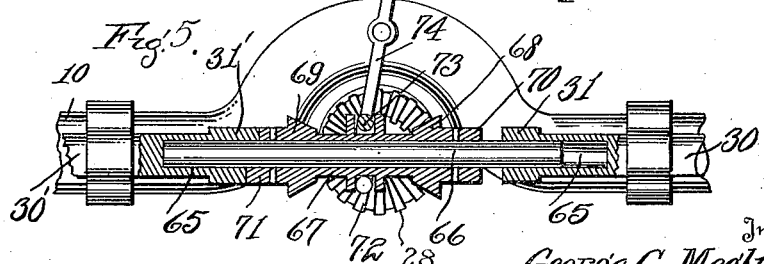
Inventor  
George C. Megling.  
By  
Attorney

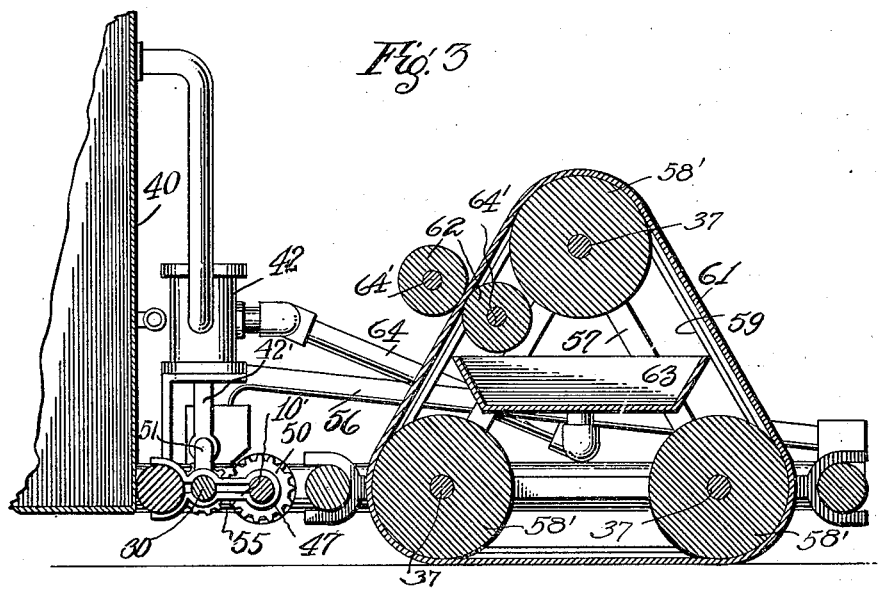
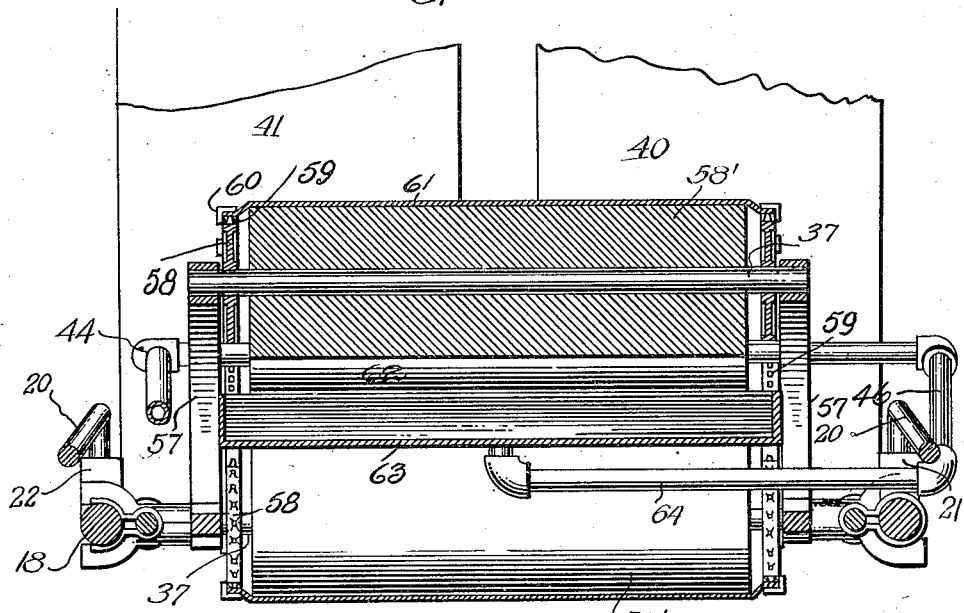

Patented Mar. 20, 1928.

1,663,056

UNITED STATES PATENT OFFICE.

GEORGE C. MEGLING, OF CANTON, OHIO.

SCRUBBING AND DRYING MACHINE.

Application filed February 7, 1924. Serial No. 691,265.

This invention relates to new and useful improvements in cleaning machines, and particularly to machines for drying floors.

One object of the invention is to provide a machine by means of which a floor may be properly dried after a cleaning fluid has been sprayed onto the surface to be cleaned, and the surface scrubbed.

Another object is to provide a machine of this character wherein the drying cloth is moved on the surface at a greater rate of speed than the machine, and is passed between squeezing or wringing rollers to extract the fluid, said fluid being pumped back into a receptacle.

Other objects and advantages will be apparent from the following description when taken in connection with the accompanying drawings.

In the drawings:

Figure 1 is a side elevation of a portion of the main frame of the machine showing the drying device in position.

Figure 2 is a top plan view of the parts shown in Figure 1.

Figure 3 is a vertical longitudinal sectional view on the line 3—3 of Figure 2.

Figure 4 is a vertical transverse sectional view on the line 4—4 of Figure 2.

Figure 5 is an enlarged detail sectional view on the line 5—5 of Figure 2.

Referring particularly to the accompanying drawings, there is shown a main frame including the transverse front bar 10, and the longitudinal side bars 12 and 13. Mounted at each of the corners of the frame are the caster wheels 14, which permit the frame to be moved over the surface to be cleaned. Connected to the forward end of the main frame at 15, are the rear ends 16, of the side bars 17, of a forwardly extending frame 18, screws 19, being provided for securing the frame in proper horizontal position with respect to the front of the main frame. Carried by the front of the frame 18, and at each side thereof, is an upwardly and rearwardly extending arm 20, the rear ends of which are properly connected with the forward end of the main frame, at 21 and 22, respectively. Extending rearwardly and centrally from the front of the main frame is a shaft 27, having on its forward end a bevel gear 28, said shaft being adapted to be driven by any suitable motive power.

Mounted on the front portion of the main frame 10, in the brackets 10', and extending transversely of the frame, are the alined shafts 30 and 30', the inner ends of which carry the clutch members 31 and 31'. In the inner end of each shaft 30 and 30' there is formed a longitudinal bore 65, and slidable in each of these bores is one end portion of the short shaft 66. Fixed on the shaft 66 is a sleeve 67, and formed on the ends of the sleeve are the bevel gears 68 and 69, each adapted to mesh with the bevel gear 28, when the sleeve is shifted. The gears 68 and 69 have the clutch members 70 and 71 for engagement with the clutch members 31 and 31'. On the intermediate portion of the sleeve 69 there is formed a circumferential channel 72, within which are disposed the legs of the yoke 73, pivotally supported on the main frame, said yoke having an upwardly extending stem 74 projecting through an elongated slot 75 formed in the forward end of the operating lever 76, said lever being pivotally supported on the center of the front end of the main frame 10 and extending rearwardly therefrom. Mounted in the brackets 10', and extending transversely of the frame 10, forwardly of the shafts 30 and 30', is a shaft 47, and mounted on each end thereof is a bevel gear 33, which meshes with a gear 35 on a shaft 34, which is mounted on the frame 18, and extends longitudinally of the side thereof. Each of the shafts 30 and 30' has a crank, represented at 51 and 52, respectively, which are connected with the respective piston rods 42', of the pumps 42 and 43. On the forward and intermediate portions of the shafts 34 are fixed the bevel gears 36, and extending transversely of the frame 18 are the rotary brush shafts 37, the ends of said shafts having bevel gears 38 meshing with the gears 36.

It will thus be seen that when the sleeve is shifted toward the left, as shown in Figures 2 and 5, the gear 68 meshes with the gear 28, while the clutch 71 is in engagement with the clutch 31', whereby the shaft 30' will be rotated and the pump 43 driven. When the sleeve is shifted to the other limit of its movement, the clutch 70 engages the clutch 31, while the gear 69 meshes with the gear 28, thereby rotating the shaft 30, and driving the pump 42, the pump 43 being thus thrown out of operation. Furthermore, by reason of the gears 49 and 50 the shaft 47 is constantly driven, to drive both of the shafts 34, regardless of whether either of the shafts 30 or 30' is thrown out of gear. By placing the sleeve in the central or neutral position, both of the gears 68 and 69, and the clutches 70 and 71, will be disengaged, and the pumps thrown out of operation. This is for a purpose which will be later more particularly set forth herein.

Mounted on the main frame are the tanks 40 and 41. Connected to the tank 41, and extending forwardly at the side of the frame, to a point opposite the connection of the adjacent side of the frame 18, is a pipe 44, and connected with the outer end of this pipe is an L-shaped pipe 45, which extends forwardly and then transversely of the front of the frame 18, such transverse portion being perforated for the purpose of spraying cleaning fluid from the tank 41, onto the surface to be cleaned.

The motor being set in motion, the shaft 27 will be driven so as to communicate motion to one or the other of the shafts 30 and 30', and through the medium of the gears 49 and 50, the motion is transmitted to the shafts 34 and the shafts 37.

On the frame 18 are the triangular supports 57, and at the ends of the frame are mounted the sprocket wheels 58, said wheels being arranged at the angles of the supports 57, said sprockets being carried by the shafts 37. On the shafts 37 of the wheels 58, and extending longitudinally of the frame, and transversely of the machine, are the rollers 58'. Around each set of sprocket wheels 58 is engaged an endless belt 59, which is provided with a plurality of clips 60 for attachment of the marginal edges of the endless drying cloth 61. This cloth is engaged around the belts and the rollers 58', and extends across the frame 18. It will be noted that one edge of each of the triangular supports is disposed in a plane parallel to the surface to be dried, so that the lower portion of the cloth will wipe across the surface. Mounted on the triangular supports 57 are the longitudinally extending, and closely associated rollers 62, between which the rear portion of the drying cloth passes, after leaving the surface, so that the liquid taken up by the cloth may be squeezed therefrom and delivered into a trough or pan 63, mounted on and extending between the guides 57. Suitable connections 64 are made between the trough and the tank 40, through the pump 42, whereby the liquid delivered into the trough, from the drying cloth, may be pumped into the tank 40, thereby rendering the cloth sufficiently dry for further action upon the surface. The squeezing rolls 62 are driven by the frictional engagement of the drying cloth as the latter passes between the rollers. The endless belts 59 are driven by the sprockets 58, which are driven from the shafts 34, said shafts being supported on the frame, and driven by the shaft 47.

As the machine is moved over the wet floor, that portion of the drying belt 61, which passes between the lower rollers 58', will rub the wet surfaces whereby to absorb the moisture therefrom. As this portion of the drying cloth passes upwardly between the squeezing rollers 62, the liquid is squeezed from the cloth and falls into the tray 63. The pump 42, being in operation, sucks the liquid from the tray and forces said liquid into the tank 40. Thus the drying cloth is squeezed into a semi-dry condition, whereby to present an effectively absorbent portion to the floor, at all times.

What is claimed is:

1. A drying apparatus comprising a frame, a roller mounted transversely in the upper portion of the frame, a pair of rollers mounted in the lower portion of the frame and arranged in a common horizontal plane, a mop belt engaged around the rollers whereby the portions of the same between the lower rollers will wipe the surface to be dried, and means arranged between the upper roller and a lower roller for squeezing the liquid from the belt.

2. A drying apparatus comprising a frame, a roller disposed transversely in the frame, a pair of spaced transverse rollers mounted in the frame below the first roller and in the same plane, a mop belt engaged around the rollers whereby successive portions of the lap thereof pass between the lower rollers for wiping action with the surface to be dried, means for rotating the rollers, a pair of transverse rollers mounted in squeezing engagement with the belt at a point intermediate the upper roller and a lower roller, and a pan mounted in said frame in a position to receive liquid removed from the belt by the squeezing rollers.

In testimony whereof, I affix my signature.

G. C. MEGLING.